(12) United States Patent
Karhu

(10) Patent No.: US 7,987,016 B2
(45) Date of Patent: Jul. 26, 2011

(54) METHOD FOR OPTIMIZATION OF SUBSEQUENT TREATMENT PROCESSES IN PRODUCTION PLANNING

(75) Inventor: Panu Karhu, Vantaa (FI)

(73) Assignee: ABB Oy, Helsinki (FI)

( * ) Notice: Subject to any disclaimer, the term of this patent is extended or adjusted under 35 U.S.C. 154(b) by 156 days.

(21) Appl. No.: 11/854,378

(22) Filed: Sep. 12, 2007

(65) Prior Publication Data

US 2008/0071406 A1 Mar. 20, 2008

(30) Foreign Application Priority Data

Sep. 18, 2006 (EP) ...................................... 06019462

(51) Int. Cl.
*G06F 19/00* (2006.01)
(52) U.S. Cl. ........................................................ 700/173
(58) Field of Classification Search .................. 700/108, 700/122, 167, 173, 183, 184
See application file for complete search history.

(56) References Cited

U.S. PATENT DOCUMENTS

| | | | |
|---|---|---|---|
| 2006/0197769 A1 | 9/2006 | Lee | |
| 2007/0240548 A1* | 10/2007 | Pape | 83/76.1 |
| 2008/0028902 A1* | 2/2008 | Baggot et al. | 83/13 |

FOREIGN PATENT DOCUMENTS

WO WO 99/46646 A1 9/1999

OTHER PUBLICATIONS

Ray, Steven R.; "Process Reasoning"; 1987; Elsevier ; pp. 329-335.*
Tu et al.; "A concurrent Mnaufactruing Strategy for One-of-a-Kind Procduts with Complicated Sculpured Surfces" 1998; SpringerLink; The internation Journal of Advanced Manufactruing Technology; vol. 14; No. 2. pp. 93-98.*
European Search Report dated Feb. 14, 2007.
Eugene J. Zak, "Modeling Multistage Cutting Stock Problems", European Journal of Operational Research, Sep. 1, 2002, vol. 141, No. 2, pp. 313-327, Elsevier Science B.V., XP-002417241 (cited in European Search Report).
Eugene J. Zak, "Row and Column Generation Technique for a Multistage Cutting Stock Problem", Aug. 2002, vol. 29, No. 9, pp. 1143-1156, Elsevier Science Ltd., XP-002417242 (cited in European Search Report).

(Continued)

*Primary Examiner* — Ramesh B Patel
*Assistant Examiner* — Chad Rapp
(74) *Attorney, Agent, or Firm* — Buchanan Ingersoll & Rooney PC

(57) ABSTRACT

A method for optimization of subsequent treatment processes is developed. End products having end product data are generated from semi-manufactured products having semi-manufactured product data, and at least part of the semi-manufactured products are processed at least in three phases. The processing data for semi-manufactured products to be processed in the last phase are determined from the end product data, the processing data for the semi-manufactured products to be processed in the first phase are determined, the feasibility of the processing data for at least one intermediate phase is checked based on productive resources of the intermediate phase, and the optimal processing data for the first phase is determined and the processing data for the intermediate phase is generated.

14 Claims, 2 Drawing Sheets

OTHER PUBLICATIONS

J. M. Valerio de Carvalho et al., "A Computer Based Interactive Approach to a Two-Stage Cutting Stock Problem", Infor, Nov. 1994, vol. 32, No. 4, pp. 243-252, XP-008074359 (cited in European Search Report).

Y. Cui et al., "Exact and Heuristic Algorithms for Staged Cutting Problems", Proceedings. Journal of Engineering Manufacture, Mechanical Engineering Publications Ltd., 2005, vol. 219, No. 2, pp. 201-207, XP-008074328 (cited in European Search Report).

P. C. Gilmore et al., "A Linear Programming Approach to the Cutting-Stock Problem", International Business Machines Corporation, New York, May 8, 1961, pp. 849-859 (cited on p. 2 of the specification).

* cited by examiner

METHOD FOR OPTIMIZATION OF SUBSEQUENT TREATMENT PROCESSES IN PRODUCTION PLANNING

FIELD OF THE INVENTION

The present invention relates to a method and system for optimization of subsequent treatment processes as defined in the preambles of Claims 1, 2 and 3.

BACKGROUND OF THE INVENTION

In the manufacturing industry, like paper, metal, textile and chemical industry, the production process consists of several production stages with corresponding half finished products or end-products.

In many industries producing flat end-products, e.g. paper, steel and other metals, flat-sheet chemicals (e.g. polymers) and film industries, one of the final processing steps is cutting, where a wound up product (reel, coil etc) is cut into smaller products. This is done using special knives and suitable winding systems. What it basically means in practice is that a larger unit (intermediate) will be divided into smaller units (intermediate or end-product), after which further processing or packaging takes place. The end products can be wound up in rolls, machine direction cutting, or cut into sheets, machine and cross direction cutting.

One of the main reasons for postponing the cutting step towards the end of the production is that this allows the simultaneous processing of larger quantities and the design of more generic production equipment that do not depend on certain individual end-product dimensions. Determining a cutting plan faces the following difficulties: How to match the product dimensions required by the customers to those of the equipment and how to group end customer products according to their material property requirements. This problem is referred to as the trim-loss problem or cutting stock problem.

The cutting process can include several subsequent cutting phases. The rolls may also be coated or otherwise processed during the cutting process. The current trim optimization methods have been able to solve only one or two subsequent cutting phases simultaneously. There have also been limitations in considering grade changes, like coating, during the cutting process. Due to the limitations of the existing methods, the trim scheduling has been a step-wise process in the cases with more than two cutting phases and/or grade changes during the cutting process.

The classical trim-loss problem and most work done thereafter are based on the work by Gilmore and Gomory (Gilmore, P. C. and Gomory, R. E. (1961). A linear programming approach to the cutting stock problem, Part I. Operations Research, 9, pp. 849-859). This approach does not take into account the geometrical position of each end-customer product but rather evaluates patterns only through the number of occurrences of product in a pattern.

SUMMARY OF THE INVENTION

The objective of the invention is to create a method for optimization of subsequent treatment processes. The objective will be achieved as presented in the independent claims 1, 2 and 3. The dependent claims describe various embodiments of the invention.

The method optimizes subsequent treatment processes, where end products having end product data are generated from semi-manufactured products having semi-manufactured product data. At least part of the semi-manufactured products are processed at least in three phases. The method comprises the steps: the processing data for semi-manufactured products to be processed in the last phase are determined from the end product data, the processing data for the semi-manufactured products to be processed in the first phase are determined, the feasibility of the processing data for at least one intermediate phase is checked based on productive resources of the intermediate phase, the optimal processing data for the first phase is determined and the processing data for the intermediate phase is generated.

A software product data recording medium in which program code is stored, which program code will cause a computer to perform a method for optimization of subsequent treatment processes, where end-products having end-product data are generated from semi-manufactured products having semi-manufactured product data. At least part of the semi-manufactured products are processed at least in three phases. The method comprises the steps: the processing data for semi-manufactured products to be processed in the last phase are determined from the end-product data, the processing data for the semi-manufactured products to be processed in the first phase are determined, the feasibility of the processing data for at least one intermediate phase is checked based on productive resources of the intermediate phase, and the optimal processing data for the first phase is determined and the processing data for the intermediate phase is generated.

The method optimizes cutting processes, where end products having end product data are generated from semi-manufactured products having semi-manufactured product data. At least part of the semi-manufactured products is processed at least in three phases. The method comprises the steps: the processing data for semi-manufactured products to be processed in the last phase are determined from the end product data, the processing data for the semi-manufactured products to be processed in the first phase are determined, the feasibility of the processing data for at least one intermediate phase is checked based on productive resources of the intermediate phase, the optimal processing data for the first phase is determined and the processing data for the intermediate phase is generated and spacing of cutting devices is set.

The method for optimization of subsequent treatment processes can be applied to many production processes with several processing phases like paper making, steel-making (e.g. cold-rolling) and polymer film production. It reduces material losses and human effort as well as allows faster production planning.

The method for optimization of cutting processes is used to perform trim optimization, i.e. minimizing the trim loss. It then schedules a cutting process in flat-sheet industries, for instance cutting of paper or paper board. The trim optimization made for three subsequent cutting phases simultaneously reduces the trim waste during the overall cutting process and allows faster scheduling. A cutting process may also include grade conversions, e.g. coating, as part of the process.

The processing data for semi-manufactured products to be processed in a cutting process comprises of at least cutting patterns and the number of sets to be cut with each cutting pattern. The end-product data comprises of at least dimensions of end products.

The method applied to a cutting process can be applied to many industries producing flat end-products, e.g. paper, steel and other metals, flat-sheet chemicals (e.g. polymers) and film industries.

In an advantageous embodiment the method for optimization of subsequent treatment processes is performed using a computer. The programs to be used are stored in the memory of the computer or on computer readable media, for example a DVD, which can be loaded on a computing device. These computer readable media have instructions for causing the computer to execute a method.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
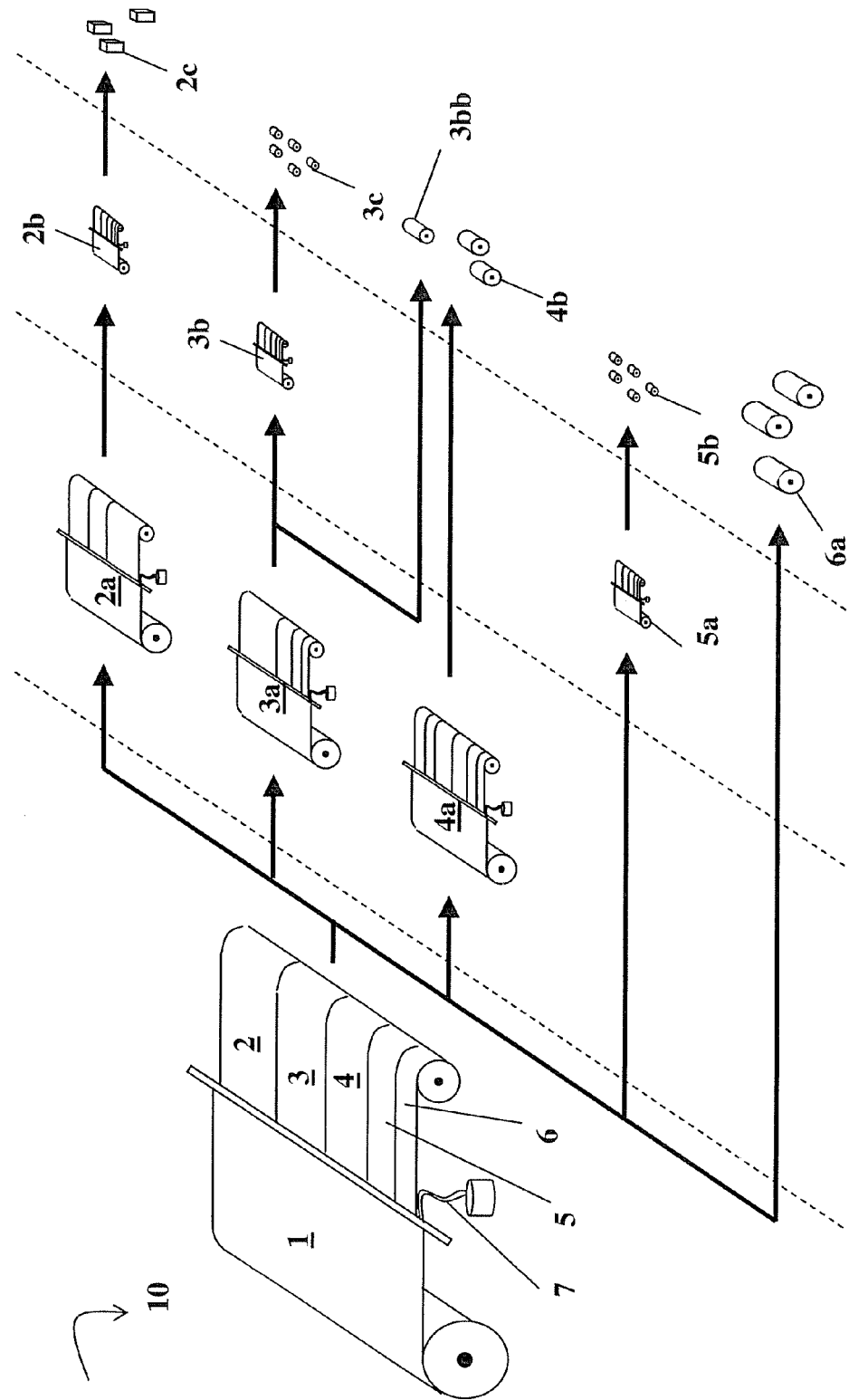
FIG. 1 presents a sample production flow with 3 phases.

FIG. 1 presents an example of a subsequent treatment process 10, a cutting process, which has a sample production flow with 1 to 3 cutting phases. Each cutting phase contains several machines with different characteristics. A band is wound up onto a reel spool forming a wound reel 1. The reel width is several meters and the band length tens of kilometers. The reel 1 is to be segmented on the basis of the required end products, rolls and sheets 2c, 3c, 3bb, 4b, 5b, 6a. The end product requirements are defined in the customers' orders. The end product data comprises of among other things the material properties and the dimensions of the end products, for instance diameters of rolls or band lengths in rolls and roll widths as well as sheet lengths and sheet widths. For the wound reel 1 the cutting patterns and the number of sets to be cut with each cutting pattern is determined based on end product data.

In the first cutting phase the cutting process is lengthwise and the wound reel 1 is cut into five smaller bands 2-6. The cutting patterns and the number of them set the width of the bands 2-6, i.e. knife spacing in the cross direction of the reel, and the length of the bands. The narrow band 7 on the edge is trim waste. The five bands are then wound up on separate reel spools forming rolls 2a-6a. One of the five rolls 6a is already an end-product and does not continue to the second and third cutting phases.

In the second cutting phase, three rolls 2a-4a out of five rolls 2a-6a formed in the first cutting phase are cut into smaller bands and wound up on separate reel spools.

In the third cutting phase, all the rolls 2b resulting from the second phase cutting of one roll 2a are cut into smaller bands and further in the sheeting process (lengthwise and crosswise cutting process) (not shown in FIG. 1) into sheets 2c, which are the end-products. A part of the rolls 3b resulting from the second phase cutting of another roll 3a are cut into smaller bands and wound up on separate reel spools 3c, which rolls are the end-products. The rest of the rolls 3bb are already end-products after the second phase cutting. Further, one roll 5a resulting from the first cutting phase is cut in the third cutting phase into a smaller bands and wound up on separate reel spools 5b, which rolls are the end-products.

The big roll in FIG. 1 is jumbo reel, for instance, which is a large reel of paper from where several reel width sizes/sheets are cut, or a coil of rolled steel in the thickness range of sheet or strip.

In FIG. 1 the cutting process is performed mechanically. There are also other methods for performing cutting operations, e.g. waterjet cutting and laser cutting. Then the nozzle spacing or laser beam spacing, i.e. spacing of cutting devices in the cutting machines, is set based on the cutting patterns.

Figure 2:
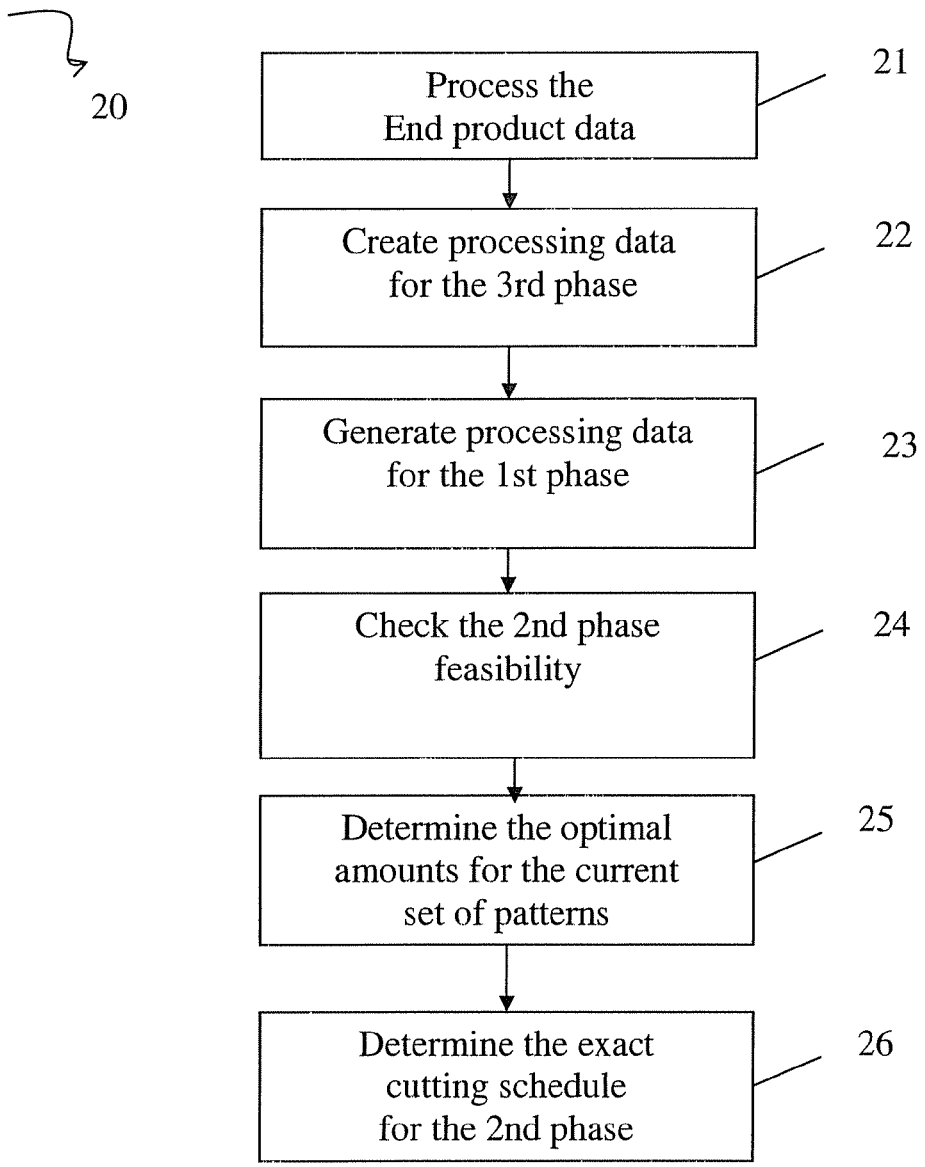
FIG. 2 presents a flow chart for a method for optimization of subsequent treatment processes in production planning applied to a cutting process.

FIG. 2 presents a flow chart 20 for the method for optimization of subsequent treatment processes in production planning applied to a cutting process.

The first step 21 of the method is to processes the end product data. The end products are rolls or sheets, for instance. They are generated from semi-manufactured products, wound up web materials, e.g. like jumbo reels or coils of material in cutting processes. The end product data comprises of among other things the material properties, the quality requirements and the dimensions of the end products, for instance diameters of rolls or band lengths in rolls and roll widths as well as sheet lengths and sheet widths. The semi-manufactured product data can be formed of several pieces of information: the dimensions of product (length, width, thickness); the material properties and the quality properties (the anomaly location map, for instance). Part of the semi-manufactured products are processed at least in three phases.

In the following step 22 the processing data for the third phase is determined from the end product data. In the application of the cutting process the cutting patterns, roll sizes, are created. In this step the appropriate machine characteristics and end-product restrictions are considered.

Then processing data for the semi-manufactured products to be processed in the first phase are determined, step 23. It includes among others one or several cutting patterns.

The feasibility of the processing data, the cutting pattern feasibility, step 24, is checked according to the second phase productive resources. Productive resources are for instance machine characteristics. The feasibility check, the determination of whether the assigned cutting tasks could be accomplished by using available resources in the second phase, is made without determining the cutting patterns explicitly. If the cutting pattern is not feasible, then the processing data for first phase is determined again, step 23.

In the following step 25 the new cutting pattern is added into the current set of first phase patterns. The optimal amounts for the current set of cutting patterns is determined, step 25. Then the optimality of the whole cutting process is checked, i.e. optimal processing data selection minimizes trim loss.

If the result, the processing data for the cutting process, is not optimal, then the processing data for the semi-manufactured products to be processed in the first phase is calculated again, step 23. After that the cutting pattern feasibility check, step 24, is performed as well as step 25.

Finally the complete processing data for the intermediate phase is generated, e.g. exact cutting sequence for the second phase rolls or sheets is determined, step 26.

The advantage of the method is simultaneous solving of all sub-problems, phases, at the same time.

The embodiments of the invention are described above are intended to be exemplary only. The scope of the invention is therefore intended to be limited solely by the scope of the appended claims.

The invention claimed is:

1. A method for optimization of subsequent treatment processes, where end products having end product data are generated from semi-manufactured products having semi-manufactured product data, and at least part of the semi-manufactured products are processed at least in three phases, wherein, the method comprises the steps:

processing data for semi-manufactured products to be processed in the last phase are determined from the end product data, processing data for the semi-manufactured products to be processed in the first phase are determined, feasibility of the processing data for at least one intermediate phase is checked based on productive resources of the intermediate phase including machine characteristics of a machine that is to be used during the intermediate phase, optimal processing data for the first phase is determined based on the checking of the feasibility of the processing data for the at least one intermediate phase, and the processing data for the intermediate phase is generated;

wherein the optimal processing data for the first phase and the generated processing data for the intermediate phase minimize trim loss.

2. The method according to claim 1, wherein if the processing data for the at least one intermediate phase is determined to be not feasible by the checking step, the processing data for the semi-manufactured products to be processed in the first phase are determined again.

3. The method according to claim 1, wherein if the processing data for the at least one intermediate phase is determined to be feasible by the checking step, the optimal processing data for the first phase is determined.

4. A software product data recording medium in which program code is stored, which program code will cause a computer to perform a method for optimization of subsequent treatment processes, where end-products having end-product data are generated from semi-manufactured products having semi-manufactured product data, and at least part of the semi-manufactured products are processed at least in three phases wherein, the method comprises the steps:

processing data for semi-manufactured products to be processed in the last phase are determined from the end-product data, processing data for the semi-manufactured products to be processed in the first phase are determined, feasibility of the processing data for at least one intermediate phase is checked based on productive resources of the intermediate phase including machine characteristics of a machine that is to be used during the intermediate phase, and optimal processing data for the first phase is determined based on the checking of the feasibility of the processing data for the at least one intermediate phase, and the processing data for the intermediate phase is generated;

wherein the optimal processing data for the first phase and the generated processing data for the intermediate phase minimize trim loss.

5. A method for optimization of cutting processes, where end products having end product data are generated from semi-manufactured products having semi-manufactured product data, and at least part of the semi-manufactured products are processed at least in three phases, wherein, the method comprises the steps:

processing data for semi-manufactured products to be processed in the last phase are determined from the end product data the processing data for the semi-manufactured products to be processed in the first phase are determined, feasibility of the processing data for at least one intermediate phase is checked based on productive resources of the intermediate phase including machine characteristics of a machine that is to be used during the intermediate phase, optimal processing data for the first phase is determined based on the checking of the feasibility of the processing data for the at least one intermediate phase, and the processing data for the intermediate phase is generated and spacing of cutting devices is set;

wherein the optimal processing data for the first phase and the generated processing data for the intermediate phase minimize trim loss.

6. The method according to claim 5, wherein, the processing data for semi-manufactured products to be processed comprises at least cutting patterns and the number of sets to be cut with each cutting pattern.

7. The method according to claim 5, wherein, the end products are rolls or sheets and the end product data comprises at least dimensions of end products.

8. The method according to claim 5, wherein, the end product data comprises the quality requirements of the end products.

9. A method for optimization of subsequent treatment processes, where end products having end product data are generated from semi-manufactured products having semi-manufactured product data, and at least part of the semi-manufactured products are processed at least in three phases, wherein, the method comprises the steps:

processing data for semi-manufactured products to be processed in the last phase are determined from the end product data, plural sets of cutting patterns for the semi-manufactured products to be processed in the first phase are generated, feasibility during at least one intermediate phase for each of sets of the cutting patterns in the first phase is checked based on productive resources of the intermediate phase including machine characteristics of a machine that is to be used during the intermediate phase without generating processing data for the intermediate phase, an optimal set of cutting patterns for the first phase is selected from the plural sets of the cutting patterns in the first phase based on the checking of the feasibility, and the processing data for the intermediate phase is generated.

10. The method according to claim 9, wherein, the end products are rolls or sheets and the end product data comprises at least dimensions of end products.

11. The method according to claim 9, wherein, the end product data comprises the quality requirements of the end products.

12. The method according to claim 9, wherein, the optimal set of cutting patterns minimizes trim loss.

13. The method according to claim 9, wherein if the feasibility check is negative for a set of cutting patterns, the set of cutting pattern which is determined to be not feasible is not eligible to be selected to be the optimal set of cutting patterns.

14. The method according to claim 9, wherein if the feasibility check is positive for a set of cutting patterns, the set of cutting pattern which is determined to be feasible is eligible to be selected to be the optimal set of cutting patterns.

* * * * *